Figure 1:
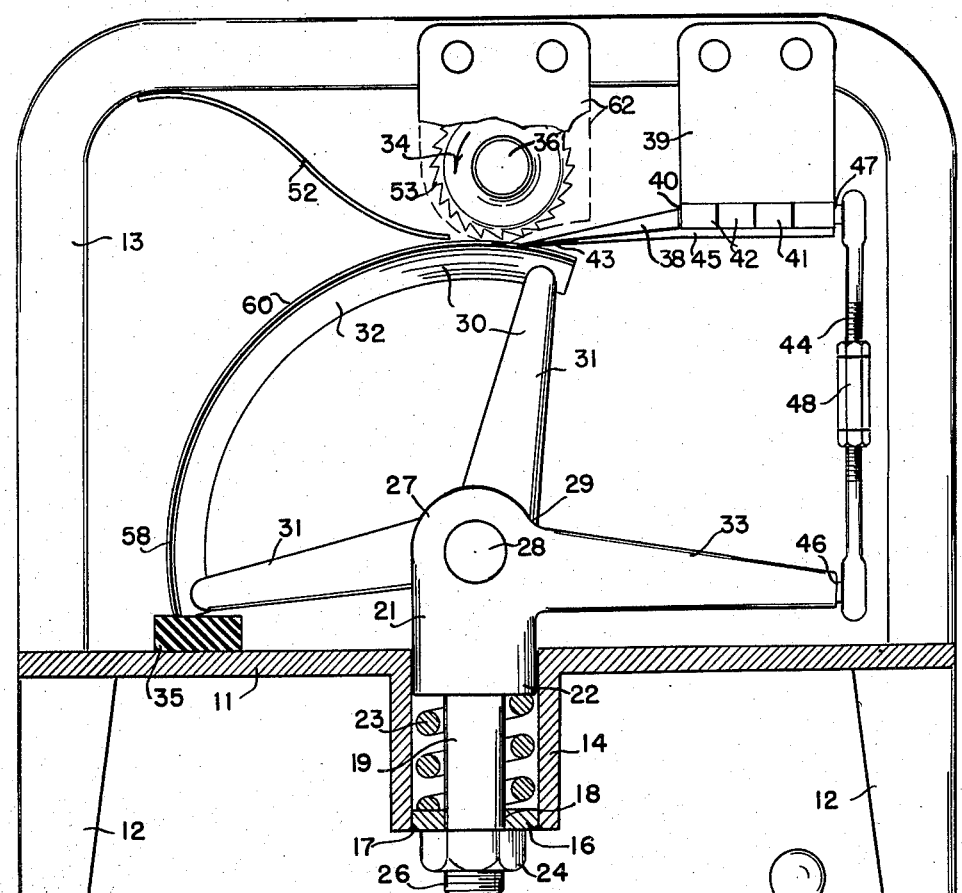

INVENTOR.
RAY G. CORNEJO

United States Patent Office 2,924,835
Patented Feb. 16, 1960

2,924,835

SHANK SKIVING SHOE MACHINERY

Ray G. Cornejo, Denver, Colo.

Application May 16, 1958, Serial No. 735,782

2 Claims. (Cl. 12—17)

The present invention relates to shoe repair machinery and, more particularly, to a shank skiving machine for making a double cut on the shank of shoes so that a repair half sole that is cooperatively cut may be closely fitted to the shank making a neat appearing and near invisible repair.

Previously, in shoe repair operations the repairman has used a skiving knife or other instrument to make a long tapered cut on the shank of the shoe sole so that a repair half sole may be mated therewith. The skiving cut, if made by hand in the usual manner, has not been straight and uniform and accordingly the irregularities have caused deformation or wrinkling of the repair half sole that is later mated to such irregular cut.

It is an object of the present invention to provide a machine which will make a neatly tapered cut at the shank of shoe soles so that neat and attractive repairs may be made. Actually this objective has been pursued by others who have provided machine apparatus for the satisfaction of this purpose. However, it is believed that the present invention presents improvements in all such prior mechanisms, since it is a further object of the present invention to provide an improved type mechanism for making the required cut.

The improvements embodied in the present invention are directed to satisfaction of additional objects inclusive of: The provision of a mechanism which automatically adjusts itself to make a regular cut irrespective of the thickness of the shoe shank being cut; the provision of mechanism which allows the tapered cut to be made along a straight line across the shoe shank; the provision of a cutting knife which may be adjustably positioned with respect to a movable shoe carrier which is likewise automatically adjustable to compensate for changes in the thickness of the shoe sole being cut; the provision of guide and shield members for accurately positioning and holding a shoe sole during the cutting operation; the provision of mechanism which is readily adaptable to mechanically powered operation; and, the provision of an efficient and economical mechanism capable of satisfying the foregoing and other additional objectives as will be more apparent from the appended description and drawings, in which Fig. 1 is a front elevational view in partial section showing features of one embodiment of the present invention; and Fig. 2 is a top plan view in partial section further showing the arrangement of elements for the machine as shown in Fig. 1.

Briefly stated, the present invention provides a shank cutting or skiving machine in which a wheel carrier is pivotally mounted and adapted to receive a shoe so that a previously loosened sole may be positioned atop the flat surface of the wheel for movement therewith toward and against a sharpened cutting knife. The desired movement is obtained through the cooperative action of a drive spur adapted to engage and move the shoe sole. The wheel carrier pivot is itself adapted for reciprocal movement toward and away from said drive spur and the cutting knife in order to compensate for differences in thicknesses of shoe soles being cut and the wheel carrier support and the cutting blade are further interconnected each to each so that adjusting movement of the wheel carrier will cause a corresponding movement of the cutting blade.

Figure 2:
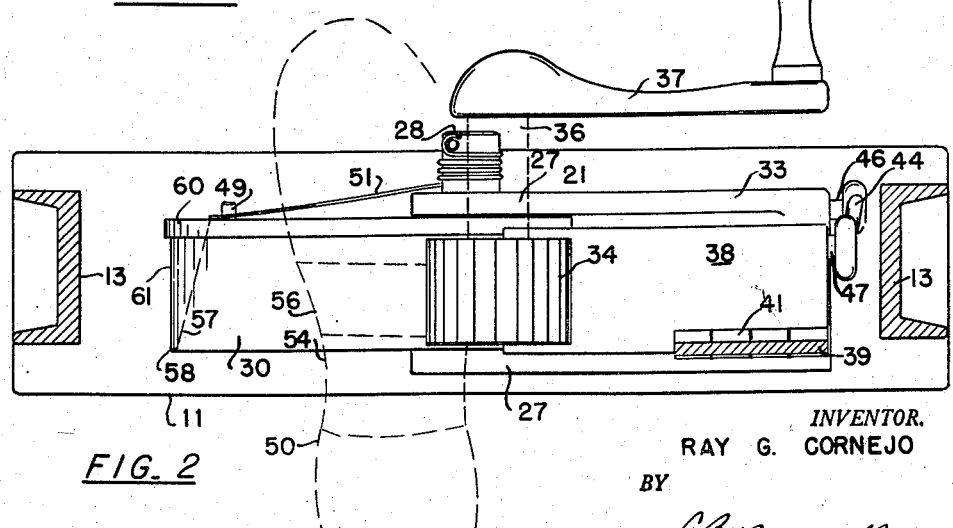

Further refinements inclusive of guide pieces, shields and sole forming members will be more apparent from the appended description and drawings in Figs. 1 and 2 of which a preferred embodiment of the present invention is shown. Here a base frame 11 having support legs 12 provides support for a substantially U-shaped frame 13 mounted above the base in inverted position. This frame 11 which may be of any suitable cross-section or of channel shape cross-section, as shown, provides mounting support for various units of the apparatus while the base frame 11 provides support for additional and cooperative members of the apparatus. As shown, the base frame 11 is provided with a cylindrical socket 14, the lower end of which is partially closed off by a ring member 16 welded at 17 to the socket 14 and providing a central opening 18 through which the shaft 19 of a pivot support unit 21 extends. The pivot support unit 21 further provides a shoulder piece 22 of cylindrical shape adapted to be received in the socket 14 for reciprocal movement therein. A spring 23 disposed within the socket 14 acts in compression between the ring 16 and the shoulder 22 to normally hold the pivot support unit 21 in a full extended position above the base frame 11 as determined by the positioning of an adjusting nut 24 which engages the threads 26 of the shaft 19.

The pivot support unit 21 itself provides spaced apart and upwardly open arms 27 adapted to support and hold the outer ends of a pivot axle 28 so that the hub 29 of wheel carrier 30 may be engaged with the pivot axle 28 between the arms 27 for rotating movement about said axle. The wheel carrier itself is made up of widely spaced apart support spokes 31 which provide support for partial ring section or rim 32 which preferably is a surface of generation having a substantially triangular cross-section. The support unit further provides a laterally extending arm 33 which moves reciprocally up and down with the support unit 21, axle 28 and wheel carrier 30.

The U-shaped frame 13 provides support for other cooperative moving members inclusive of a drive spur 34 mounted on a drive axle 36 and positioned above the wheel carrier 30 in position of near alignment with the pivot axle 28. As shown in the phantom outline in Fig. 2, the drive axle 36 is supported in its described position by bearing members (not shown) but which may be affixed to or supported by the U-shaped frame 13. This entire unit may be rotated in the direction of the arrow shown on the face of the drive spur 34, as shown in Fig. 1, by means of a crank handle 37 or by other types of mechanical and motorized drive apparatus (not shown).

In addition to the drive spur unit, a cutting knife 38 is mounted and secured on the frame 13 by means of the strap portion 39 of a hinge unit 41. This hinge unit 41, which is provided with a hinge pin 40 and interlocking segments 42 allows the cutting edge 43 of the cutting knife 38 to be tilted about the hinge pin 40. Preferably the axis of the hinge pin 40 is substantially aligned with one edge of the wheel carrier 30 and slightly above a position tangent to the uppermost surface of the wheel carrier ring rim. This positioning provides a correct tilting action for the cutting knife 38.

With all of the moving elements cooperatively positioned as shown, a connecting rod 44 is provided to interconnect a pin 46 on extension arm 33 of pivot support unit 21 and a similar pin 47 on the outer extremity of lower hinge plate 45 or of the cutting blade 38. With this arrangement, reciprocal up and down movement of the pivot support unit 21 and wheel carrier 30 will cause a corresponding up and down movement of the outer end of the bottom hinge plate 45 resulting in a tilting of the cutting edge 43 of the knife 38. This vertical reciprocal movement of the wheel carrier 30 and tilting movement of the cutting knife 38 may be cooperatively adjusted each to each by means of adjustment of the turn buckle 48 on the connecting rod 44.

In use a shoe shown in phantom outline as shoe 50 is positioned on the apparatus so that the sole of the shoe which has previously been loosened from the welt will be on top of the flat rim surface 32 of the wheel carrier 30 while the upper and rest of the shoe is disposed between spokes 31 and beneath tapered rim 32. Initiating movement by the operator will move the shoe 50 and wheel carrier 30 about the pivot 28 against the spring force exerted by spring 51 which acts between the pivot 28 and pin 49 on rim 32. Continued movement will bring the raised shoe sole against guide leaf 52 to be directed down toward drive spur 34 and into engagement with the spurs 53 of drive spur 34. Thereafter rotation of drive spur 34 and drive axle 36 by motive means or by rotation of crank handle 37 will cause the shoe sole to move toward knife 38.

As the shoe sole passes under the drive spur 34, the thickness of the sole being on top of rim 32 will cause the wheel carrier 30 and all of support unit 21 to move reciprocally downwardly into socket 14 as the pressure of spring 23 is overcome. This downward reciprocal movement will be transmitted by spaced arms 27 and extension arm 33 to the pin 46 and connecting rod 44 to move the outer free end of hinge piece 45 and cutting knife 38 downwardly a distance corresponding to the thickness of the shoe sole. Accordingly, as the sole moves toward the knife edge 43 the position of the knife will be adjusted so that a tapered cut 56 can be made to sever the sole from its shank portion 54.

Since it is desirable to avoid ripping too much of the sole shank 54 away from the shoe, the wheel carrier rim 32 is preferably of a tapered or triangular cross section as shown by the hidden outline at 57. This structure provides a narrow entrance edge 58 and a tapered rim body. However, a flange 60 is provided on the outer upper surface of rim 32. This flange 60 need only be raised a minor distance of about one-sixteenth inch or less to assure clean severing of the shoe sole when the drive spur 34 is positioned for level contact with the remainder of the flat rim face 61 and the knife 38 is adjusted and placed in position above and only slightly out of contact with the raised rim flange 60. The downward pressure of the drive spur 34 and the obstruction of flange 60 cause the shoe sole 54 to be curved upwardly to be cut by the knife 38 at the free end.

A shield piece 62 shown partially and in phantom outline in Fig. 1 likewise helps to guide and position the shoe sole for accurate and straight tapered cuts. Further, it is noted that the described equipment is readily adaptable to powered operation either by a separate motor connected directly to drive axle 36 or through gear reduction units. Likewise, the device may be used as a unit on the conventional power train of shoe repair machinery.

While one embodiment of the invention has been shown and described, various modifications and changes are possible without departure from the scope of the hereunto appended claims.

What is claimed is:

1. A shoe shank skiving machine comprising a base frame, an open support frame thereabove, a support unit mounted for reciprocal movement with respect to said frames, a pivot member on said support unit, a wheel carrier for rotating movement about said pivot, said wheel carrier having a rim adapted to support and move a shoe sole, a drive spur on said support frame and above said wheel carrier for engaging the soles of shoes disposed on said wheel carrier, a cutting knife pivotally mounted on said support frame in position above said wheel carrier and adjacent said drive spur with the pivoted edge of said cutting knife adjacent one edge of said wheel carrier and at a higher elevation than the free edge of said cutting knife, means for rotating said drive spur to move said wheel carrier, shoe and shoe sole toward said cutting knife, means interconnecting said wheel carrier support unit and said cutting knife whereby the positioning of said knife is changed to accommodate and make a tapered cut on shoe soles of varying thickness, and a shield piece on said frame extending downwardly past said drive spur forwardly of the cutting knife for further guiding said shoe sole into position to be cut.

2. A shoe shank skiving machine comprising a base frame, an open support frame thereabove, a support unit mounted for reciprocal movement with respect to said frames, a pivot member on said support unit, a segmental wheel carrier for rotating movement about said pivot, said wheel carrier having a rim structure of tapered cross-section adapted to support a shoe sole, and spaced apart spokes for holding said rim, said spokes and rim providing an opening through which a shoe may be passed as the loosened sole of said shoe is positioned above said tapered rim, a drive spur on said support frame and above said wheel carrier for engaging the soles of shoes disposed on said wheel carrier, a cutting knife pivotally mounted on said support frame in position above said wheel carrier and adjacent said drive spur with the pivoted edge of said cutting knife adjacent one edge of said wheel carrier and at a higher elevation than the free edge of said cutting knife, means for rotating said drive spur to move said wheel carrier, shoe and shoe sole toward said cutting knife, means interconnecting said wheel carrier support unit and said cutting knife whereby the positioning of said knife is changed to accommodate and make a tapered cut on shoe soles of varying thickness, and a shield piece on said frame extending downwardly past said drive spur forwardly of the cutting knife for further guiding said shoe sole into position to be cut.

References Cited in the file of this patent

UNITED STATES PATENTS 2,702,911    Marcelli _____ Mar. 1, 1955

FOREIGN PATENTS 592,317    Great Britain _____ Sept. 15, 1947